United States Patent
Milone

(10) Patent No.: US 7,452,294 B2
(45) Date of Patent: Nov. 18, 2008

(54) TRAINING METHOD FOR THE USE OF A BATTERING RAM

(76) Inventor: Paul Milone, 20505 Gobbler Ridge, Pacific Junction, IA (US) 51561

( * ) Notice: Subject to any disclaimer, the term of this patent is extended or adjusted under 35 U.S.C. 154(b) by 0 days.

(21) Appl. No.: 11/430,769

(22) Filed: May 9, 2006

(65) Prior Publication Data
US 2007/0261870 A1 Nov. 15, 2007

(51) Int. Cl.
*A63B 67/00* (2006.01)
(52) U.S. Cl. .................. 473/441; 473/445; 173/1; 173/162.2; 173/171; 173/90; 482/123
(58) Field of Classification Search ............... 173/90, 173/210, 211, 162.1, 171, 1, 162.2; 482/75, 482/83, 123; 473/441, 445; 267/140; 124/16, 124/29
See application file for complete search history.

(56) References Cited

U.S. PATENT DOCUMENTS

| | | | | | |
|---|---|---|---|---|---|
| 2,390,336 | A | * | 12/1945 | Spearman | 73/379.04 |
| 2,644,334 | A | * | 7/1953 | Perry | 73/379.04 |
| 3,329,428 | A | * | 7/1967 | Moran | 473/441 |
| 3,578,324 | A | * | 5/1971 | Alvey et al. | 473/441 |
| 3,608,882 | A | * | 9/1971 | Culp | 267/140 |
| 3,674,265 | A | * | 7/1972 | Sheets et al. | 473/441 |
| 3,749,400 | A | * | 7/1973 | Stoffel | 482/123 |
| 3,873,089 | A | * | 3/1975 | Krug | 473/445 |
| 3,897,060 | A | * | 7/1975 | Jennings | 473/441 |
| 4,026,552 | A | * | 5/1977 | Schmid | 473/112 |
| 4,477,076 | A | * | 10/1984 | Monaco | 473/441 |
| 4,943,057 | A | * | 7/1990 | Felder | 473/445 |
| 5,474,290 | A | * | 12/1995 | Rascona et al. | 473/441 |
| 5,645,515 | A | * | 7/1997 | Armstrong et al. | 482/75 |
| 6,802,799 | B2 | * | 10/2004 | Gomez | 482/83 |

* cited by examiner

*Primary Examiner*—Scott A. Smith
(74) *Attorney, Agent, or Firm*—Stinson Morrison Hecker LLP

(57) ABSTRACT

A method of training a user to swing a battering ram where the user is positioned at the forward end of a training device. The training device comprises a support frame, a piston rod slidably mounted to the support frame, and a striking plate affixed to the piston rod. The striking plate is positioned at a forward end of the training device when the piston rod is in a pre-impact position. The resistance of a secured door is replicated in the training device by biasing the piston rod toward the forward end of the training device. The piston rod slidably moves rearward upon each impact of the battering ram and then returns to its pre-impact position in time to receive the next impact of the battering ram. The user repeatedly swings the battering ram impacting the training device without stopping or pausing between swings to hone proper technique, mechanics and timing of the swings.

18 Claims, 3 Drawing Sheets

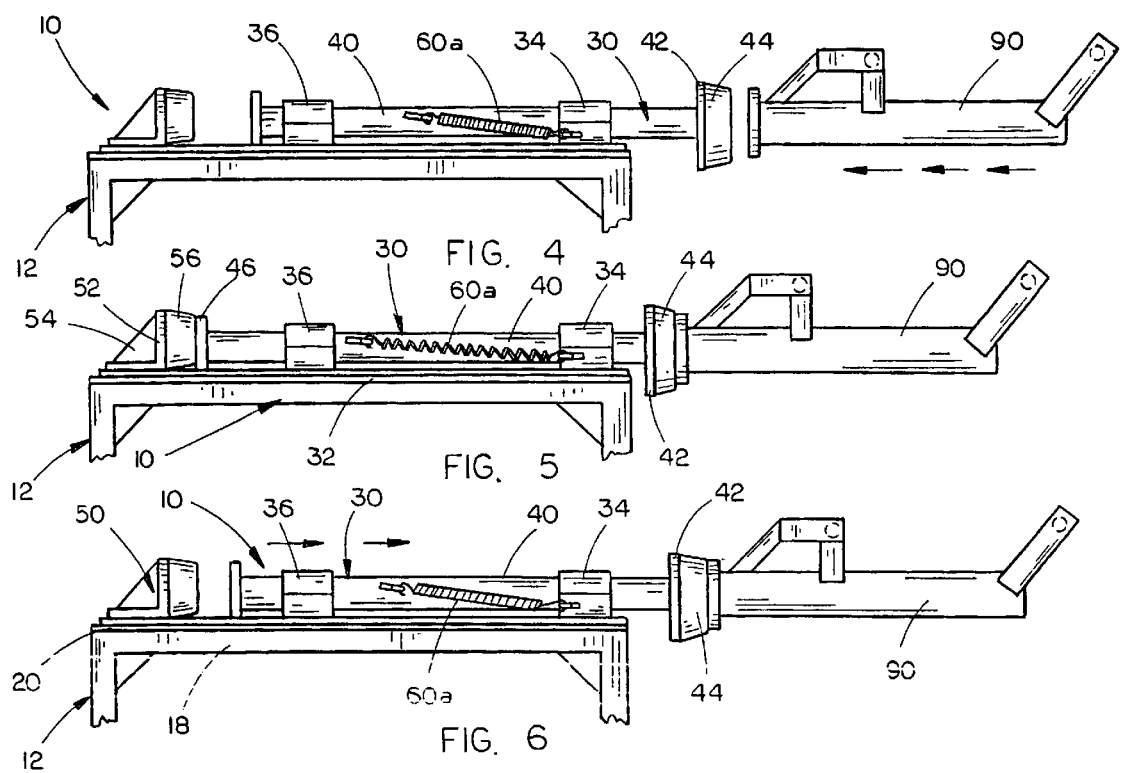

TRAINING METHOD FOR THE USE OF A BATTERING RAM

BACKGROUND OF THE INVENTION

1. Technical Field

The present invention relates to training devices for law enforcement and public safety workers and, more particularly, to a battering ram usage training device which includes a support frame and a ram impact-receiving device mounted on the support frame, the device including at least one piston rod support collar mounted on the support frame, a main piston rod slidably mounted within the support collar, a striking plate mounted on the forward end of the main piston rod, one or more biasing springs which bias the main piston rod forwards within the support collar, and a piston rod stop mounted on the support frame rearwards of the piston rod, the ram impact-receiving device operative to receive an impact from a battering ram on the striking plate, which moves the main piston rod rearwards within the support collar, however, the biasing springs slow, stop and reverse the rearward motion of the main piston rod to return the main piston rod generally to its pre-impact position so that the ram impact-receiving device is once again for impact from a battering ram or the like.

2. Description of the Prior Art

Being a police officer or firefighter often involves putting oneself in dangerous situations in which the person must rely on his or her training to properly respond and get out of the situation. Therefore, beyond just properly performing one's duties as a police officer or firefighter, a secondary and perhaps no less important element of the job is undertaking the necessary training to ensure that one performs the job activities in a safe and effective manner. There are many different training devices which have been designed for police officers and firefighters such as various types of hand-to-hand combat training devices, various types of target shooting and gun safety practice devices and various types of simulation weapons which are used during training for the purposes of replicating actual weapons which may be used by assailants or criminals. However, there are several activities, such as breaking down doors, which are inherently difficult to train for, yet which actually may be some of the most dangerous activities performed in the course of the job.

An example of such a dangerous activity is when a locked or closed door stands between the police officer or firefighters and their quarry. Obviously, being unable to discern the location and readiness of potential assailants and potential hazards beyond the locked or closed door is a very dangerous situation, and it is critical in such a situation that the locked or closed door be battered down as quickly and efficiently as possible to preserve the elements of surprise and safety, elements which are lost when removal of the door takes relatively long time. To remove doors, several devices have been invented, but the most efficient and reliable device currently available is the simple battering ram which can be used to impact the door and knock the door down or open. In general, a battering ram includes a heavy main bar having an impact plate mounted on the front end thereof and one or more handles which are fixed to the main bar to provide gripping locations for the individual using the battering ram. The operator, upon reaching a locked or closed door which needs to be opened, would draw the battering ram back and swing it forward using the momentum of the battering ram to impact the closed or locked door to force it open or knock it down in as few swings as possible. It is important to note, however, that proper use of the battering ram is not a simple task, as it is quite heavy and unwieldy and requires proper technique and mechanics to swing the battering ram to impact the door in the correct location to force it open with a minimum number of impacts. It should be further noted that this skill is a particularly important one for urban police officers and urban combat personnel to learn, as they are the individuals that most often encounter closed or locked doors in room to room and building to building combat and chase scenarios.

Unfortunately, however, it is the rare instance where practice of the proper technique for swinging the battering ram is available, due to the significant problem that use of the battering ram damages or destroys the door being impacted. Because of this, it is only when buildings which have been abandoned or are scheduled for demolition become available to police officers that the opportunity to practice the proper technique of the use of the battering ram become available. As these situations arise only infrequently, it is very rare that police officers, firefighters or urban combat soldiers receive sufficient training to develop the proper technique and mechanics for swinging the battering ram. Even more importantly, it is one thing to develop the proper technique and mechanics for swinging the battering ram, but one must also develop the proper rhythm for swinging the ram properly, as it is uncommon that the door will give after a single blow from the battering ram. The goal, of course, is to break down the door as quickly as possible, and therefore development of the proper rhythm and timing of the swing is equally important as developing proper mechanics and technique for swinging the battering ram. It is clear that there will never be enough doors available for an entire troop to practice their battering ram technique, and therefore there is a need for a training device with which persons can train in the proper use of a battering ram and can do so in a safe and effective manner.

Therefore, an object of the present invention is to provide a battering ram usage training device which will permit the user to hone the proper technique and rhythm used in use of a battering ram.

Another object of the present invention is to provide a battering ram usage training device which includes a support frame and a ram impact-receiving device mounted on the support frame, the device including at least one piston rod support collar mounted on the support frame and a main piston rod slidably mounted within the support collar, the piston rod including the striking plate on one end thereof and biasing springs connected thereto to bias the rod forwards within the support collar such that upon the battering ram being used to impact the impact-receiving device, the main piston rod is slidably moved rearwards within the support collar via the impact, and the biasing springs bias the main piston rod to slow, stop and reverse the rearward motion of the main piston rod and return it to its pre-impact position in a very short period of time so that the ram impact-receiving device is again ready to receive a battering ram impact.

Another object of the present invention is to provide a battering ram usage training device which will permit multiple impacts of the battering ram with the device in a relatively short period of time in order to provide for the development of not only proper mechanics and technique but also the proper rhythm for swinging the battering ram.

Another object of the present invention is to provide a battering ram usage training device in which the force applied by the biasing springs may be increased or decreased in order to provide appropriate biasing force to the piston rod thereby accommodating persons of greater or lesser strength who are training with the present invention.

Another object of the present invention is to provide a battering ram usage training device which can be used not only for strict training purposes, but also may be used in connection with other activities such as an obstacle course or the like in which real-life situations are replicated by the elements of the obstacle course thereby adding a level of realism or difficulty not presently available.

Finally, an object of the present invention is to provide a battering ram usage training device which is relatively simple and durable in construction and is safe, efficient and effective in use.

SUMMARY OF THE INVENTION

The present invention provides a battering ram usage training device which includes a support frame having forward and rearward ends and a ram impact-receiving device mounted on the support frame having at least one piston rod support collar mounted on the support frame and a main piston rod having a forward end and a rearward end, the main piston rod slidably mounted in the at least one piston rod support collar. A striking plate is mounted on the forward end of the main piston rod and at least one biasing spring is connected to the main piston rod from the piston rod support collar for biasing the main piston rod forwards within the at least one piston rod support collar. A piston rod stop is mounted on the support frame rearwards of the at least one piston rod support collar and the main piston rod and is operative to restrict rearward motion of the main piston rod. Finally, the ram impact-receiving device is operative to receive an impact from a battering ram on the striking plate, the main piston rod being slidably moved rearwards within the at least one piston rod support collar via the impact, the biasing springs biasing the main piston rod to slow, stop and reverse the rearward motion of the main piston rod to return the main piston rod generally to its pre-impact position within the at least one piston rod support collar whereby the ram impact-receiving device is again ready to receive an impact.

The battering ram usage training device of the present invention as thus described provides a substantial advantage over other training devices found in the prior art. For example, because the present invention permits a user to swing the battering ram multiple times over a short period of time without requiring resetting or rebuilding of the door being battered, development of proper technique and rhythm occurs in a far shorter period of time than would be available were the present invention not available. Furthermore, because there are only a limited number of doors available to be broken down, it is highly unlikely that each and every member of the police force would be able to receive sufficient training in the use of the battering ram, whereas with the present invention, each person who uses the invention may quickly and easily obtain the requisite amount and degree of training in the proper use of the battering ram. Finally, because the biasing force utilized with the main piston may be modified or changed, the present invention may be used by persons of all abilities and all strengths who desire training in the proper use of a battering ram or the like. It is thus seen that the present invention provides a substantial improvement over those training devices found in the prior art.

BRIEF DESCRIPTION OF THE DRAWINGS

FIGS. 4-6 are detailed side elevational views of the present invention showing the sequence of operation when a battering ram is used to impact the battering ram usage training device of the present invention.

DESCRIPTION OF THE PREFERRED EMBODIMENT

Figure 1:
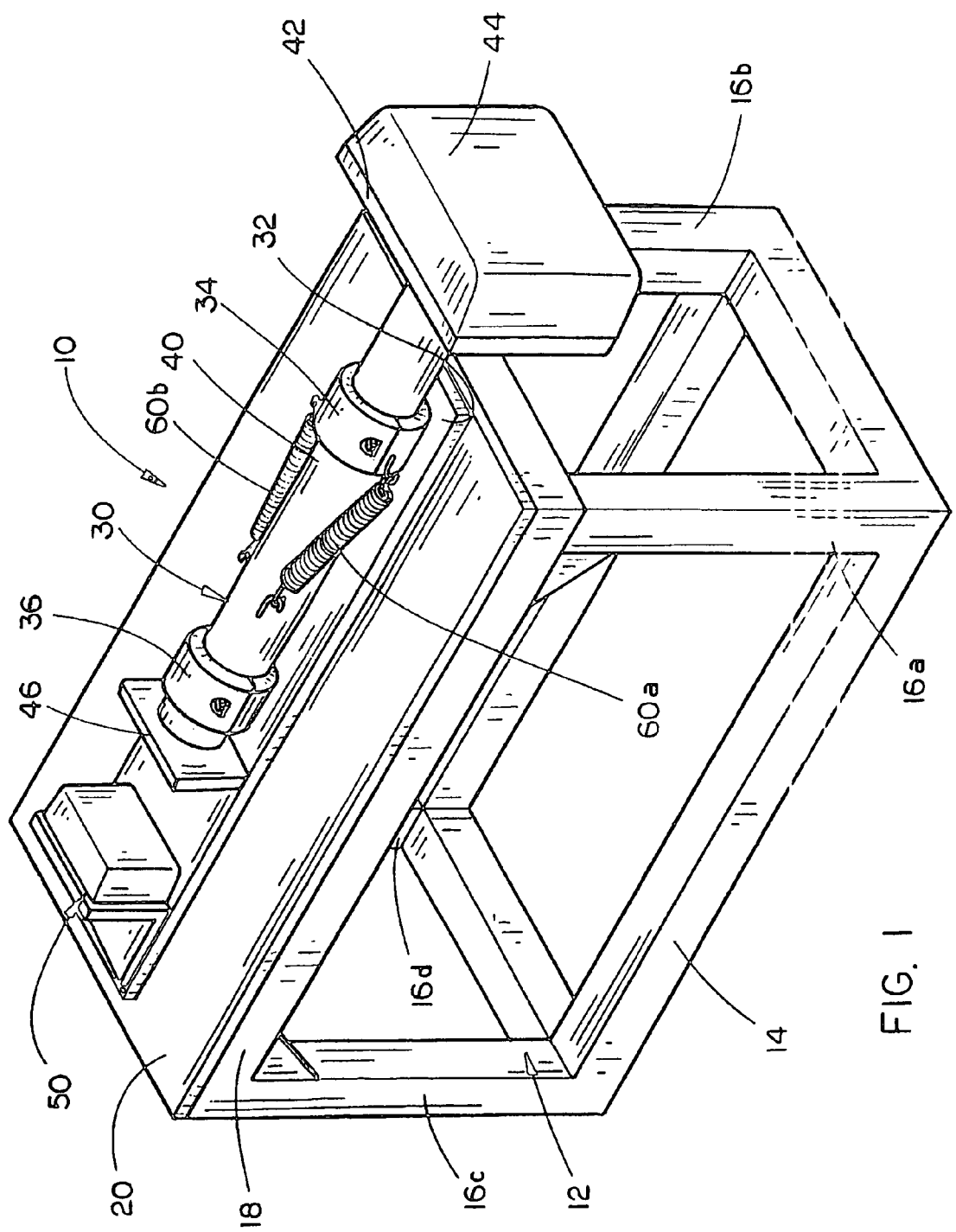
FIG. 1 is a perspective view of the battering ram usage training device of the present invention.
Figure 2:
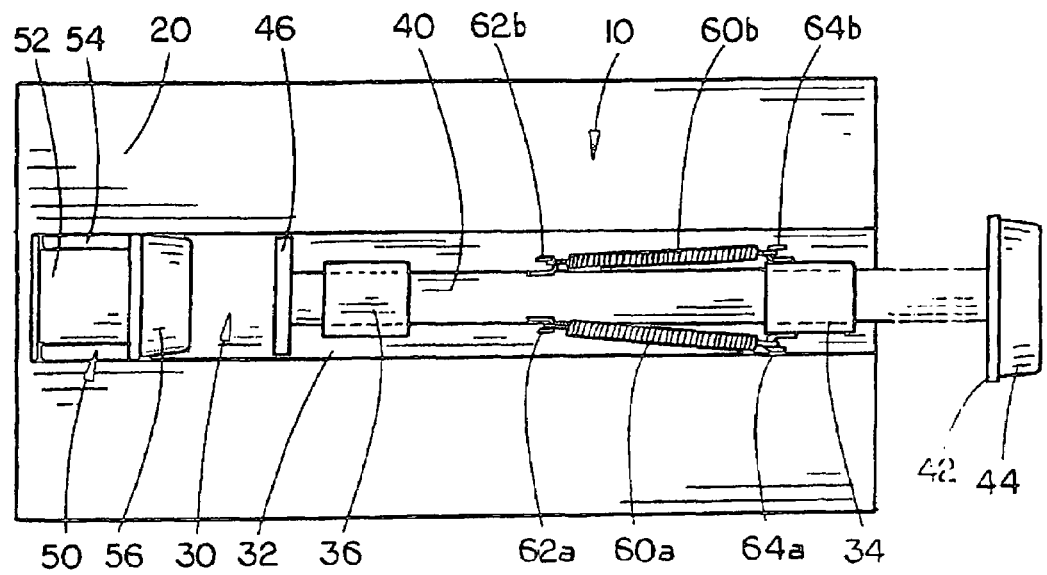
FIG. 2 is a top plan view of the device.
Figure 3:
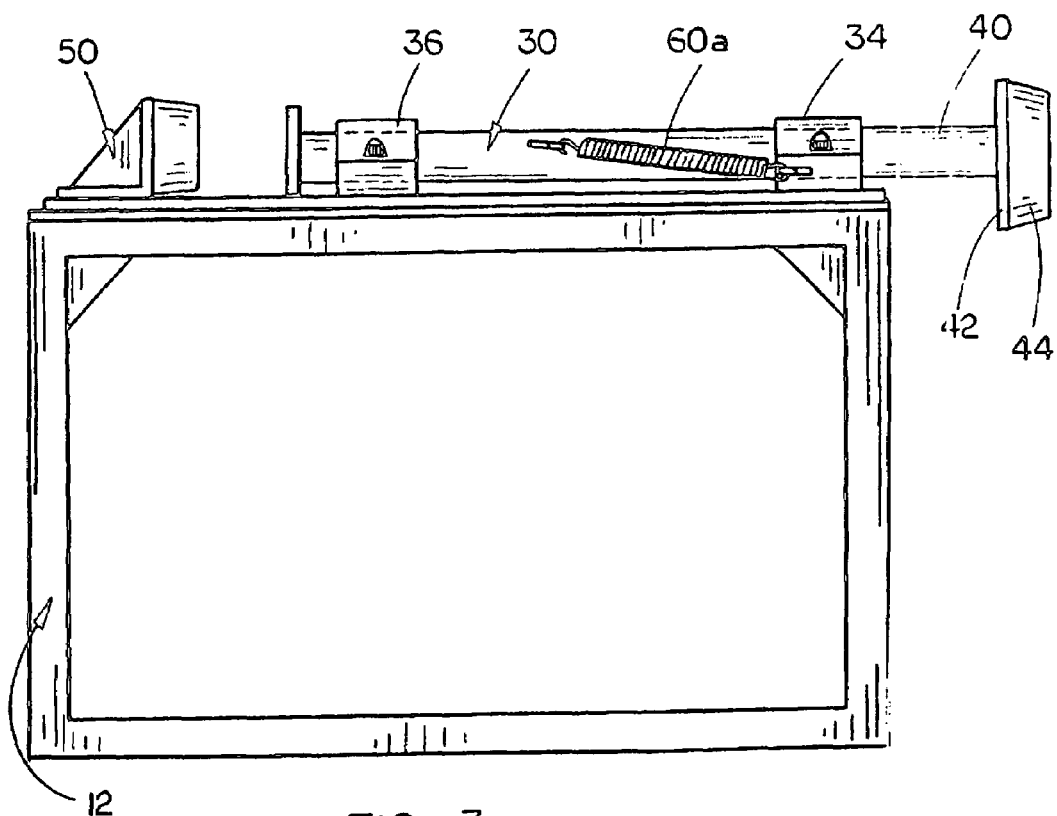
FIG. 3 is a side elevational view of the present invention.

The battering ram usage training device 10 of the present invention is shown best in FIGS. 1-3 as including a generally rectangular box support frame 12 on which is mounted the ram impact-receiving device 30. In the preferred embodiment, the support frame 12 would be constructed of sturdy steel tubing and have dimensions of approximately thirty to thirty-six inches in height, thirty-six to sixty inches in length, and eighteen to thirty inches in width. The generally rectangular base frame 14 would have four upwardly-extending legs 16a, 16b, 16c and 16d mounted thereon which supports a similar generally rectangular upper support frame 18, with the entire structure being welded or bolted together to ensure a sturdy and rigid platform for support of the ram impact-receiving device 30. Finally, mounted on top of the upper support frame 18 is a steel plate 20 which provides a further degree of support for the ram impact-receiving device 30, the top plate 20 being secured on upper support frame 18 by a plurality of bolts or by being welded thereon. Of course, the precise size, shape and dimensions of the support frame 12 are not critical to the present invention so long as the intended functional characteristic of providing a sturdy and rigid support base for the ram impact-receiving device 30 is maintained.

The ram impact-receiving device 30 is best shown in FIGS. 1-3 as including a generally rectangular base plate 32 which extends almost the full length of top plate 20, base plate 32 having dimensions of approximately thirty-six to sixty inches in length and six to ten inches in width, with a thickness of approximately one-half to one inch. Mounted on the base plate 32 are front and rear piston rod support collars 34 and 36 which, in the preferred embodiment, will be cylindrical steel collars having inner diameters of approximately three inches and outer diameters of approximately three and one half to four inches, depending on the thickness of the piston rod support collars 34 and 36. The front and rear piston rod support collars 34 and 36 would be mounted on the base plate 32 in general concentric parallel alignment and, in the preferred embodiment, each will be constructed as two halves for each of the front and rear piston rod support collars 34 and 36 (i.e. top half and bottom half) to permit the piston rod support collars 34 and 36 to be opened for easy insertion and removal of the piston rod 40 as will be described later herein. Of course, the inclusion of such an arrangement is not particularly critical to the functionality of the present invention, although it has been found that the facilitation of assembly and disassembly of the battering ram usage training device 10 is preferable to include.

Slidably mounted within the front and rear piston rod support collars 34 and 36 is main piston rod 40, as shown best in FIGS. 1-3. In the preferred embodiment, the main piston rod 40 would be constructed of a three inch diameter metal pipe having a length of approximately thirty to forty inches with the external diameter of the main piston rod 40 being slightly less than the internal diameter of the front and rear piston rod support collars 34 and 36. In this manner, the main piston rod 40 is slidably mounted within the front and rear piston rod support collars 34 and 36 such that the main piston rod 40 may be moved forward and rearwards on the battering ram usage training device 10. Mounted on the forward end of the main piston rod 40 is a striking plate 42 which preferably includes a high-impact rubber bumper 44 mounted thereon. In the preferred embodiment, the striking plate 42 would have dimensions of approximately 12 inches by 12 inches, with the rubber pad 44 having similar height and width dimensions. When the main piston rod 40 is in its pre-strike or pre-impact position, the striking plate 42 is supported approximately ten to twelve inches forwards of the front end of the support frame 12, as shown best in FIGS. 1 and 3. This distance is only important in that it is preferred that the striking plate 42 not accidentally impact the forward portion of the support frame 12 when the main piston rod 40 travels rearwards within front and rear piston rod support collars 34 and 36.

To prevent this from occurring, however, the present invention proposes inclusion of a piston rod stop 50 mounted rearwards of the main piston rod 40 on the base plate 32 of the ram impact-receiving device 30. In the preferred embodiment, the piston rod stop 50 would include a section of angle iron 52 having a structural gusset 54 extending therewithin, with a rubber bumper 56 mounted on the forward portion of the angle iron 52. Mounted on the rear end of the main piston rod 40 is a transverse piston rod stop impact plate 46 which is positioned approximately eight inches in front of the piston rod stop 50 when the main piston rod 40 is in its rest position. As the main piston rod 40 moves rearward, the piston rod stop impact plate 46 may contact the rubber bumper 56 of piston rod stop 50, and if it does so, further rearward motion of the main piston rod 40 is prevented. To properly replicate the resistance of a door to the impact of the battering ram, however, it is necessary to include an additional functional element with the present invention.

Specifically, at least two biasing springs 60a and 60b extend between the main piston rod 40 and the front piston rod support collar 34, as shown best in FIGS. 1-3. These biasing springs 60a and 60b are very powerful coil springs which bias the main piston rod 40 forwards relative to the front piston rod support collar 34, and the biasing springs 60a and 60b would preferably be mounted to the main piston rod 40 and front piston rod support collar 34 by a plurality of J-hooks 62a, 62b, 64a and 64b, although the exact means for connection of the biasing springs 60a and 60b to the main piston rod 40 and front piston rod support collar 34 is not critical to the present invention so long as the biasing springs 60a and 60b may be quickly removed and replaced on the ram impact-receiving device 30. The biasing springs 60a and 60b provide no forward bias to the main piston rod 40 when in their rest position, as shown best in FIG. 1-3. However, as the main piston rod 40 is moved rearwards within the front and rear piston rod support collars 34 and 36, the biasing springs 60a and 60b provide an increasing amount of forward biasing force to the main piston rod 40 to prevent the main piston rod 40 from continuing to move rearwards on the battering ram usage training device 10. Because of the strength of the biasing springs 60a and 60b, the main piston rod 40 will generally move only six to eight inches rearwards in total before rebounding to move forwards within the front and rear piston rod support collars 34 and 36, although the strength of the impact will generally determine the degree and amount of motion of the main piston rod 40. It is an important feature of the present invention that the biasing springs 60a and 60b be removable from the main piston rod 40 and the front piston rod support collar 34 in order to permit the substitution of biasing springs having stronger or weaker bias strengths to ensure proper coordination of the strength of the biasing springs with the strength of the individual using the present invention. Such coordination will generally be determined through experimentation, although it is expected that the initial biasing springs 60a and 60b used in connection with the present invention will permit the main piston rod 40 to travel approximately six inches rearwards when impacted by a battering ram 90 wielded by a male police officer of average size and strength.

It should also be noted that the biasing springs 60a and 60b, although described with some particularity, may be replaced with many different types of biasing devices, such as hydraulic pistons, pneumatic pistons, compression springs or virtually any other type of biasing device. The key consideration for any such biasing device, however, is that it provide the same general functionality as the biasing springs 60a and 60b in the present invention, and therefore substitution of such alternative biasing devices should be understood to be a part of this disclosure.

The battering ram usage training device 10 of the present invention would be used in the manner depicted in FIGS. 4-6 wherein a battering ram 90 being wielded by an individual would be swung forward to impact the rubber pad 44 on striking plate 42. FIG. 4 illustrates the immediate pre-impact positioning of the main piston rod 40 on the ram impact-receiving device 30 and as the battering ram 90 impacts the rubber pad 44 on striking plate 42, the main piston rod 40 is driven backwards relative to the support frame 12 as the main piston rod 40 slides within the front and rear piston rod support collars 34 and 36. The biasing springs 60a and 60b are thus extended and consequently exert a pull on the main piston rod 40 in the forward direction against the impact force of the battering ram 90 thereby counteracting the impact force. If the impact is very strong, the main piston rod 40 may actually move rearwards a sufficient distance to contact the piston rod stop 50, as shown in FIG. 5, although it is preferred that the majority of impacts not result in contact between the main piston rod 40 and the piston rod stop 50. Once the impact force from the battering ram 90 is absorbed by the biasing springs 60a and 60b, the biasing springs 60a and 60b act to return the main piston rod 40 to its pre-impact position, as they bias the main piston rod 40 forwards within the front and rear piston rod support collars 34 and 36. This "resets" the ram impact-receiving device 30 in anticipation of the next impact from the battering ram 90.

It is important to note that the time interval between impact and reset of the ram impact-receiving device 30 is extremely quick, on the order of one to three seconds, and therefore the present invention can be used to practice not only the correct technique for swinging the battering ram 90 but also to practice the proper rhythm of swinging of the battering ram 90, which is one of the more difficult elements of proper battering ram use to learn given the lack of opportunity for multiple repetitions of the battering ram swinging motion. Following resetting of the ram impact-receiving device 30, the battering ram usage training device 10 is thus once again ready for further impacts from the battering ram 90, as shown in FIG. 6.

It is to be understood that numerous additions, modifications and substitutions may be made to the battering ram usage training device 10 of the present invention which fall within the intended broad scope of the appended claims. For example, the exact size, shape and construction materials used in connection with the present invention may be modified or changed so long as the functional and operational characteristics of the device are generally maintained. Furthermore, it is a preferred element of the present invention that the entire device be constructed in an easily assembled and disassembled configuration, so that the battering ram usage training device 10 of the present invention may be moved to a desired location and quickly erected for use at that location. This will broaden the opportunities for use of the present invention and therefore permit many more persons to use the present invention to hone their skills in using the battering ram 90. Also, it may be beneficial to secure the support frame 12 to the ground surface on which the support frame 12 is resting by a plurality of spikes, stakes or other such ground-engaging devices, in order to secure the battering ram usage training device 10 in a specified location and prevent movement of the unit following impact. It is also entirely probable that a manufacturer or user of the present invention would desire to include some type of measuring device such as an impact force measuring device or one which calculates the PSI of the compression of the main piston rod 40 resulting from the impact of the battering ram 90 therewith. The inclusion and functionality of such measuring devices would be understood by one skilled in the art of the use of such measuring devices, and therefore their use with the battering ram usage training device 10 of the present invention should be understood to be a part of this disclosure. Finally, although the present invention has been described as being used primarily in connection with battering rams and the like, many other manually operated impact delivery devices such as sledgehammers, etc. may be used in connection with the present invention to hone the particular use skill associated with the use of that device.

There has therefore been shown and described a battering ram usage training device 10 which accomplishes at least all of its intended objectives.

I claim:

1. A method of training a user to use a battering ram, said method comprising the steps of:
   positioning a user at a forward end of a training device, said training device comprising a support frame, at least one piston rod slidably mounted to said support frame, and a striking plate affixed to said at least one piston rod such that said striking plate is positioned at a forward end of said training device when said at least one piston rod is in a pre-impact position;
   having the user repeatedly swing a battering ram without stopping or pausing between swings in an effort to impact said striking plate with said battering ram upon each swing; and
   replicating the resistance of a door to each impact of said battering ram by biasing said at least one piston rod toward the forward end of said training device, wherein said at least one piston rod slidably moves toward a rearward end of said training device upon each impact and is then biased forward to return said piston rod to its pre-impact position such that said striking plate is positioned in time to receive the next impact.

2. The method of claim 1, further comprising the step of selecting a strength of said biasing to correspond to the strength of said user.

3. The method of claim 2, wherein said the step of replicating the resistance of a door to each impact of the battering ram is performed by at least one biasing coil spring removably secured to said piston rod to bias said piston rod toward the forward end of said training device and said method additionally comprises selecting a coil spring having a bias strength based upon the strength of the user.

4. The method of claim 1, wherein said striking plate further comprises a rubber impact bumper mounted on the forward end of said striking plate.

5. The method of claim 1, wherein said support frame comprises a piston rod stop mounted on said support frame rearwards of said at least one piston rod operative to restrict rearward motion of said piston rod.

6. The method of claim 5, wherein said piston rod stop comprises a section of angle iron having a structural gusset extending therewithin and a rubber bumper mounted on the forward portion of said angle iron nearest said piston rod whereby said piston rod stop is operative to restrict rearward motion of said piston rod.

7. The method of claim 1, wherein said support frame comprises at least one piston rod support collar mounted on said support frame in communication with said at least one piston rod, each generally cylindrical in cross-section with the inner diameter of said at least one piston rod support collar being slightly greater than the outer diameter of said piston rod.

8. The method of claim 7, wherein said at least one piston rod support collar comprises front and rear piston rod support collars mounted on said support frame in general axial concentric parallel alignment.

9. The method of claim 1, wherein said step of replicating the resistance of a door to each impact of the battering ram is performed by at least one biasing coil spring secured to said piston rod to bias said piston rod toward the forward end of said training device.

10. A method of training for the use of a battering ram, said method comprising the steps of:
    repeatedly swinging a battering ram in a rhythmic motion without stopping or pausing between swings in an effort to impact a striking plate positioned at the forward end of a training device, said training device additionally comprising at least one piston rod to which said striking plate is attached, wherein said piston rod is biased toward the forward end of said training device so as to replicate the resistance of a door to each impact of said battering ram and wherein said piston rod slidably moves toward a rearward end of said training device upon each impact and is then biased forward to return said striking plate to its position at the forward end of said training device in time to receive the next impact.

11. The method of claim 10, further comprising the step of selecting a strength of said biasing to correspond to the strength of said user.

12. The method of claim 11, wherein said training device comprises at least one biasing coil spring removably secured to said piston rod to bias said piston rod toward the forward end of said training device in a manner to replicate the resistance of a door to each impact of the battering ram and said method additionally comprises selecting a coil spring having a bias strength based upon the strength of the user.

13. The method of claim 10, wherein said striking plate further comprises a rubber impact bumper mounted on the forward end of said striking plate.

14. The method of claim 10, wherein said support frame comprises a piston rod stop mounted on said support frame rearwards of said at least one piston rod operative to restrict rearward motion of said piston rod.

15. The method of claim 14, wherein said piston rod stop comprises a section of angle iron having a structural gusset extending therewithin and a rubber bumper mounted on the forward portion of said angle iron nearest said piston rod whereby said piston rod stop is operative to restrict rearward motion of said piston rod.

16. The method of claim 15, wherein said support frame comprises at least one piston rod support collar mounted on said support frame in communication with said at least one piston rod, each generally cylindrical in cross-section with the inner diameter of said at least one piston rod support collar being slightly greater than the outer diameter of said piston rod.

17. The method of claim 16, wherein said at least one piston rod support collar comprises front and rear piston rod support collars mounted on said support frame in general axial concentric parallel alignment.

18. The method of claim 10, wherein said training device comprises at least one biasing coil spring secured to said piston rod to bias said piston rod toward the forward end of said training device in a manner to replicate the resistance of a door to each impact of the battering ram.

* * * * *